US005899539A

United States Patent [19]

Lin et al.

[11] Patent Number: 5,899,539

[45] Date of Patent: May 4, 1999

[54] HUB ASSEMBLY OF BICYCLE

[76] Inventors: Jing-Chen Lin, No. 173, Kuei Suei St.; Ming-Chang Lin, No. 66, Huai An St., both of Kaohsiung City, Taiwan

[21] Appl. No.: 08/838,897

[22] Filed: Apr. 11, 1997

[51] Int. Cl.$^6$ .................................................. B60B 27/00

[52] U.S. Cl. .................................. 301/110.5; 301/105.1

[58] Field of Search .................................. 301/59, 105.1, 301/110.5

[56] References Cited

U.S. PATENT DOCUMENTS

| | | | |
|---|---|---|---|
| 555,932 | 3/1896 | Curtis | 301/110.5 |
| 644,139 | 2/1900 | Laass | 301/110.5 X |

FOREIGN PATENT DOCUMENTS

| | | | |
|---|---|---|---|
| 452387 | 5/1913 | France | 301/110.5 |
| 475722 | 6/1913 | France | 301/110.5 |
| 11124 | 6/1891 | United Kingdom | 301/110.5 |
| 308907 | 4/1929 | United Kingdom | 301/110.5 |

*Primary Examiner*—Russell D. Stormer
*Attorney, Agent, or Firm*—Rosenberg, Klein & Bilker

[57] ABSTRACT

A hub assembly for a bicycle wheel is provided which includes a hub shell and two ball cups. The hub shell has two flat rod ends at respective ends of the hub. An arched portion is formed at a bottom portion of each flat rod end. A hub flange is formed on the inside of each flat rod end at the base of an arched portion, and a flare extending from inside of the hub flange to a center portion of the hub is provided. The ball cup has a hollow tapered journal and a shoulder hole formed therein to divide the tapered journal from a flared ball cup at the other end. In assembly, the ball cup is fixed into the hub by a force fit between the outside surface of the ball cup and the inside surface of the flat rod end, the flare clamping the tapered journal, and positively locating the ball caps within the hub.

1 Claim, 4 Drawing Sheets

HUB ASSEMBLY OF BICYCLE

BACKGROUND OF THE INVENTION

FIELD OF THE INVENTION

The present invention relates to a hub assembly for bicycle wheels, and more particularly to a hub assembly with a higher setting accuracy.

PRIOR ART

Conventional hub assemblies for bicycle wheels are provided in two different types, as shown in FIG. 3 and FIG. 4. One of the types includes hubs and ball cups made of a steel bar and sheet by means of punching, stretching and cold-forging, and press fitting the parts together. The other type is made of a die-casting alloy. The advantage of the first kind is its low product cost, and the advantage of the latter is its resulting high quality product without any production and installation accuracy problems. However, the alloy is too soft, such that the ball cup is worn out by the balls in a shorter time, especially when running on a tough road, the service life will be even shorter. In addition to high product cost, bicycle wheels with alloy hubs are not yet popular in the market. So, the first kind of hub assembly still has a large share in the market, but it is subject to the production and installation accuracy problem.

Referring to FIG. 3 and FIG. 4, cross-sectional views of conventional hub assemblies molded by a steel rod or sheet are shown. The hub shell 1 is made by cold-forging the steel rod, and there are two flat rod ends at respective ends of the hub for fixing a ball cup 2 within a respective end with a force fit. The ball cut 2 is formed into a pan shape with a through-hole at a center bottom portion for an axle 4 to be inserted therethrough, and a ball groove 23 for holding the ball in with a ball race 231 and a ball race 41 of the axle 4. But some shortcomings still exist in it, as follows:

1. the ball race 231 of the ball cup 2 is hanging in the hub shell 1, depending from the flange of the ball cup 2 at the mouth of a respective flat rod end 41 of the hub shell 1. Due to production and installation errors of the ball cup 2 and the hub shell 1, a gap may exist between them so that the ball cup 2 will beat as it pivots on the axle 4, thereby causing an unbalanced stress on the balls. Thereby, it will call the balls to break up and damage the surfaces of the ball races 231 and 41 of the ball cup 2 and the axle 4. When the gap enlarges, as a result of working under those conditions for a long time, the wheel will not work normally.

2. for decreasing the production error and the installation error associated with the installation of the ball cup 2 into the hub shell 1, equipment must be renewed and procedures and tools increased, thereby increasing production cost.

OBJECTS AND SUMMARY OF THE INVENTION

It is therefore one object of this invention to provide a hub assembly for a bicycle wheel with a higher setting accuracy and without increasing additional production cost.

The present invention includes a hub shell and two ball cups, in which the hub shell has two flat rod ends at respective ends of the hub, two hub flanges at the base of the flat rod ends, respectively, and a flare extending from inside of each hub flange to a center portion. Corresponding to the flare, the ball cup has a hollow tapered journal extending from the rear side to fit in the flared portion. In assembly, the outside surface of the ball cup fits contiguously with the inside surface of the flat rod ends, and the tapered journal of the ball cup fits in the flare of the hub shell, as a bell-socket joint, to define a locating point, so as to eliminate any gap between the ball cup and the hub shell.

DETAILED DESCRIPTION OF PREFERRED EMBODIMENTS

Figure 1:
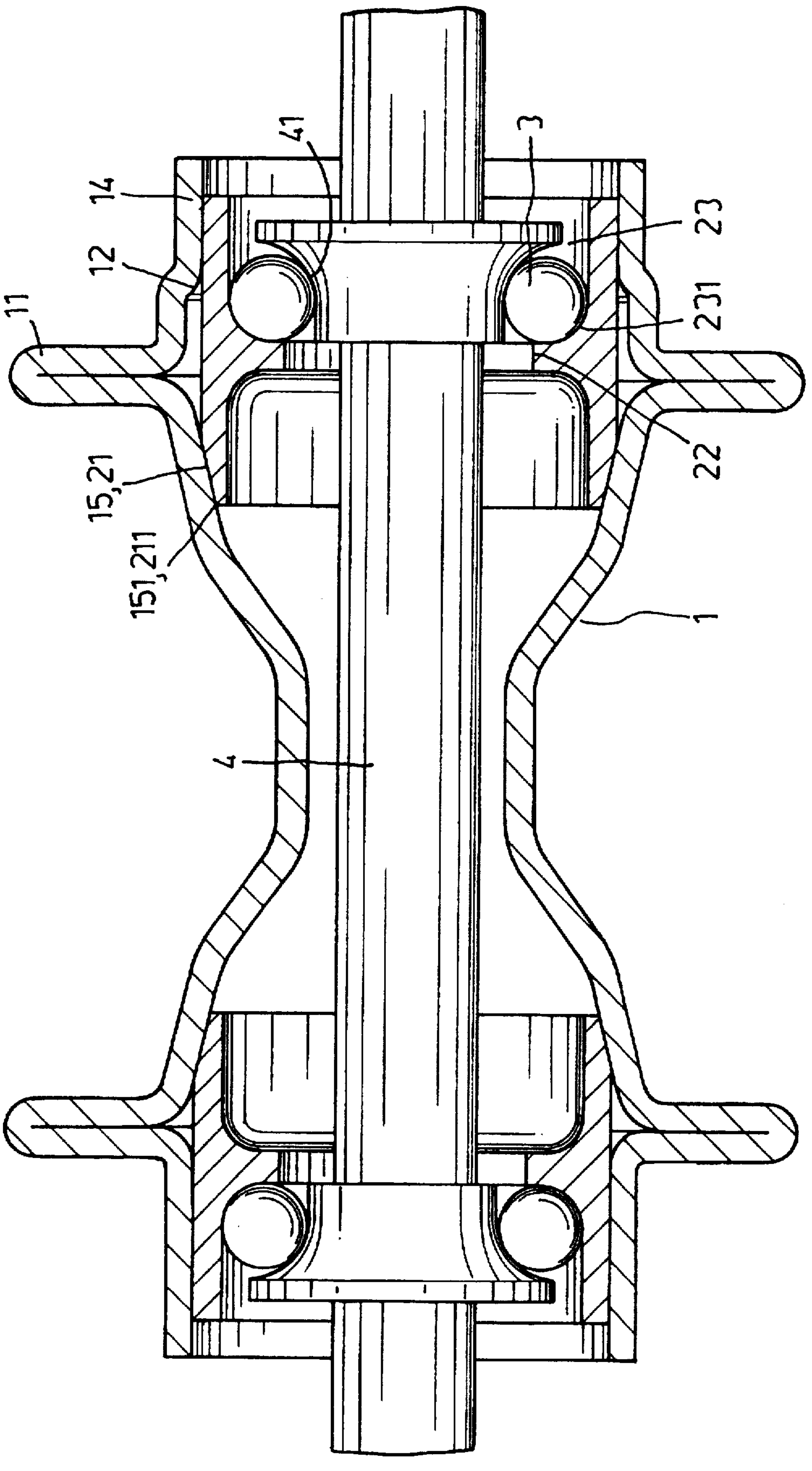
FIG. 1 is a cross-section view showing the first operation of the present invention.

Referring to FIG. 1, the present invention includes a hub shell 1, two ball cups 2, balls 3 and an axle 4.

The hub shell 1 is made by cold-forging a steel rod, which has two flat rod ends 14 with an arched portion 12 at a bottom portion, and a hub flange 11 formed at the inner end of each arched portion 12, and a flare 15 extending from inside of each hub flange 11 to the center portion and connecting with a hole shoulder 13 to form a locating point 151 at the joining ring. The inner wall of the flat rod end 14 can be processed to form a mating surface for a force fit with the outer surface of the ball cup 2. The tapered journal of each ball cup 2 mates with a flare 15 to hold the ball cup 2 within a respective flat rod end. The ball cup 2 is formed by forging a steel rod, in which the inner end is formed with a hollow tapered journal having a locating end point 211, and a shoulder hole 22 formed in the ball cup 2 for passage of the axle 4 therethrough and to divide the flaring ball cup 23, with a ball race 231 cooperating to the axle 4 to hold the balls 3 therein, from the hollow tapered journal.

Figure 2:
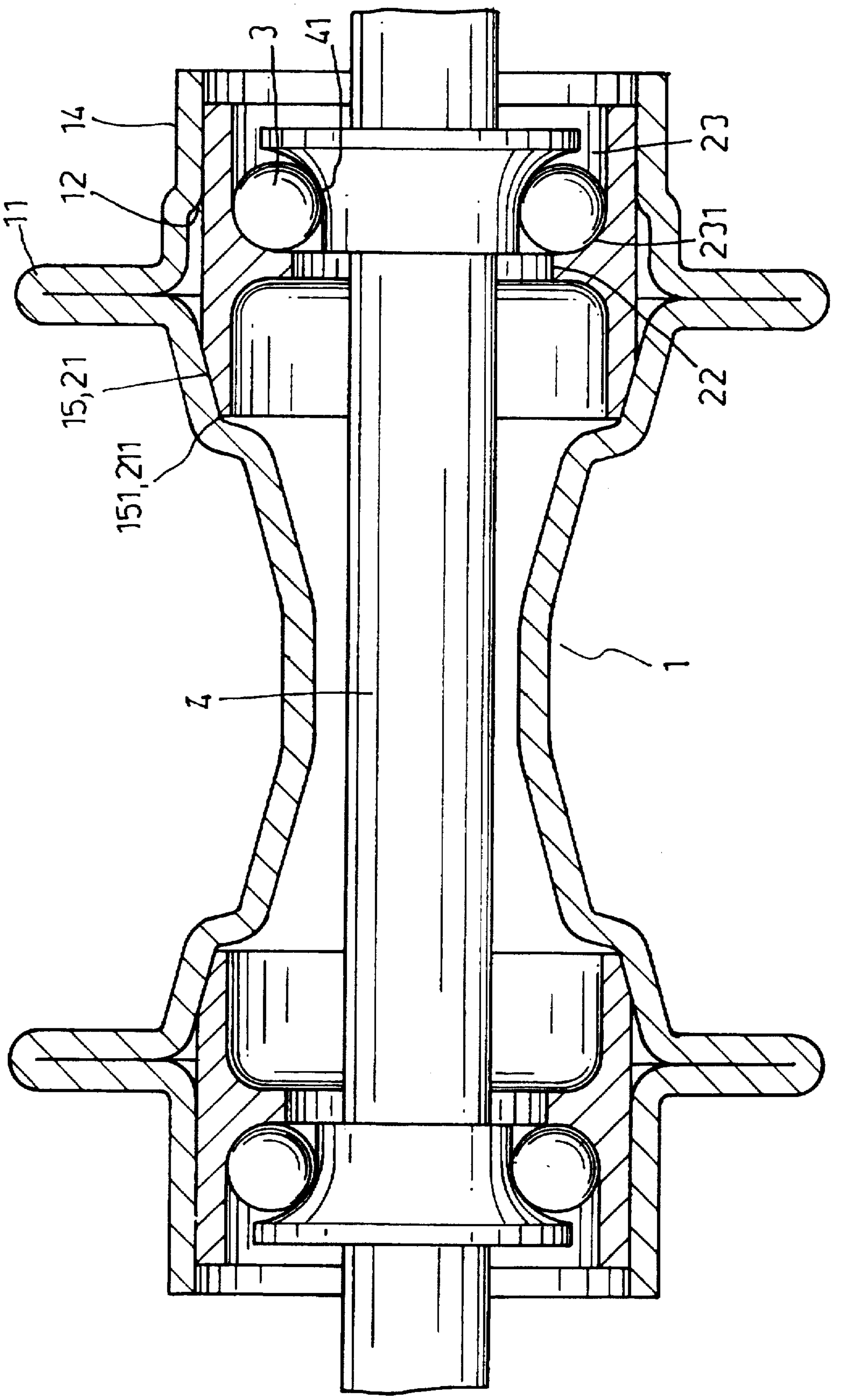
FIG. 2 is a cross-section view showing the second operation of the present invention.
Figure 3:
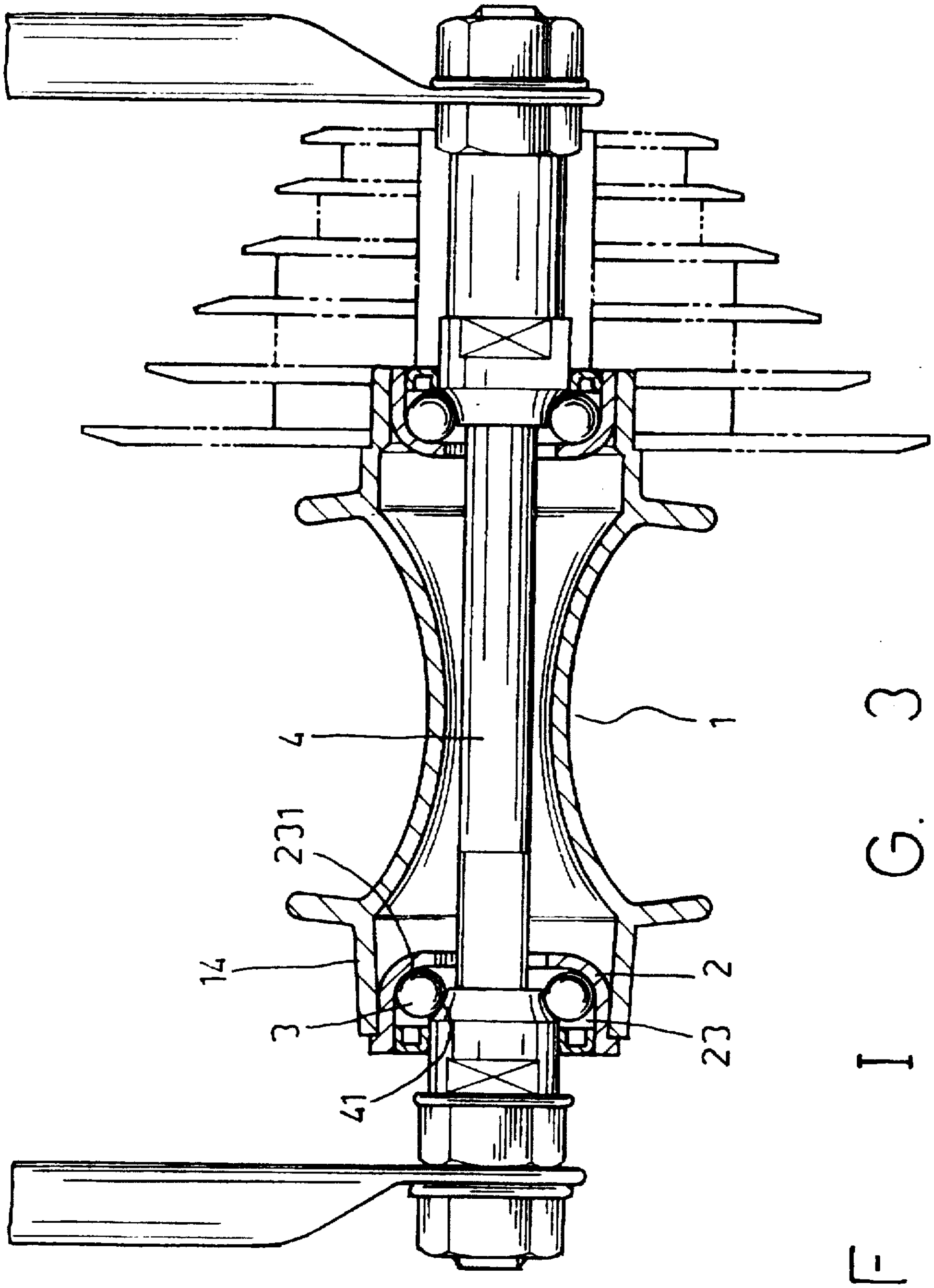
FIG. 3 is a cross-section view showing a first prior art.
Figure 4:
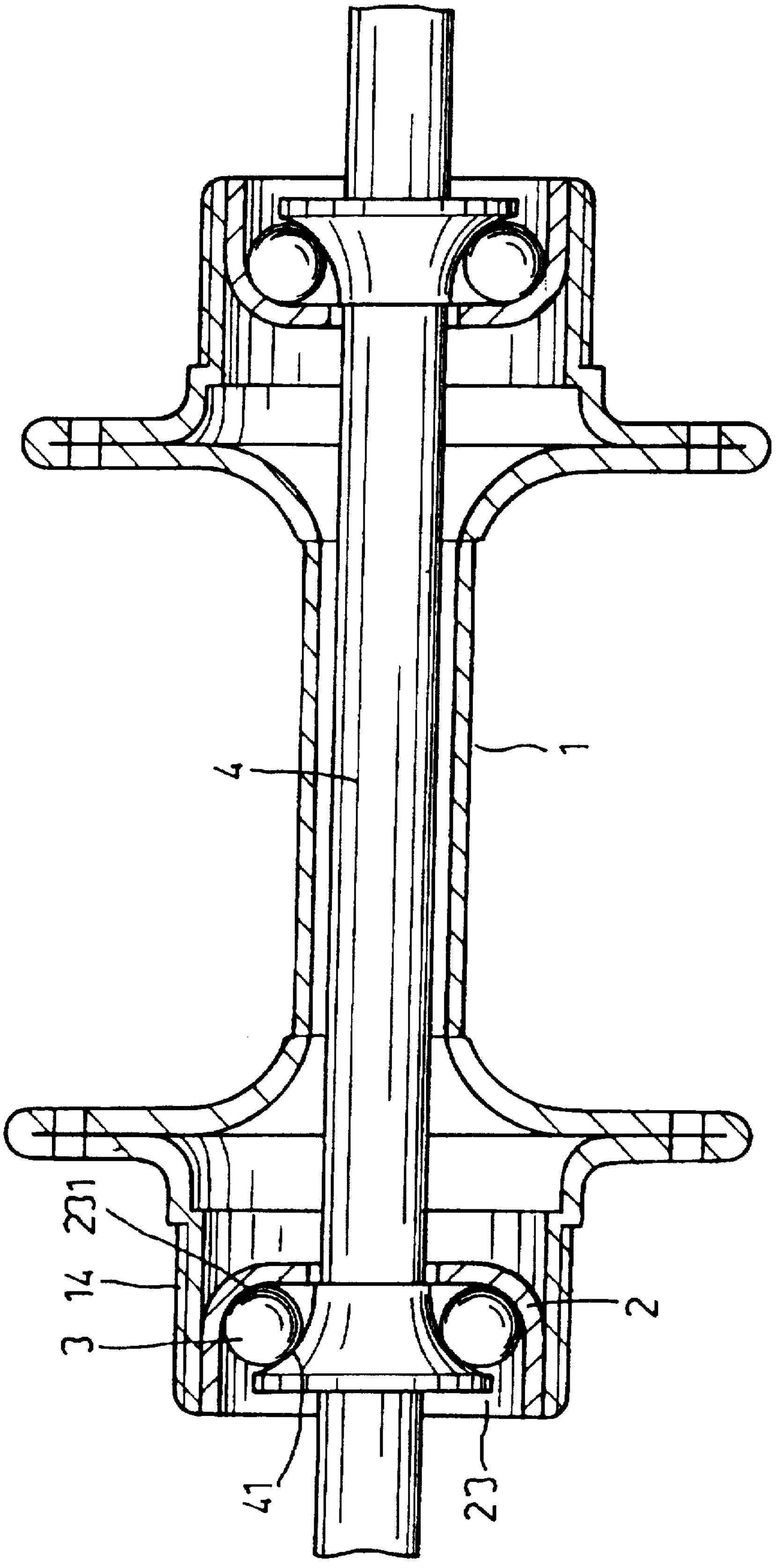
FIG. 4 is a cross-section view showing a second prior art.

In assembly, referring to FIG. 1, a hydraulic press is used for pressing the ball cup 2 into the flat rod end 14 of the hub shell 1, until the locating points 211 and 151 of the tapered journal 22 and flare 15 are in contiguous contact with each other. The ball cup 2 is thereby fixed within the hub shell 1. In another type of assembly operation, as shown in FIG. 2, between the joining ring 16 of the flare 15 and the hole shoulder 13 is a locating point 151 to form an insertion stop for the ball cup 2. In this assembly, the hollow tapered journal 21 is slightly deformed to make a tighter joint, without any detriment to the installation and operation of the balls 3 and the axle 4, which facilitates automation of the installation.

Whether the first or the second assembly operation is used, respectively shown in FIG. 1 and FIG. 2, a gap between the ball cup 2 and the hub shell 1 is eliminated by the contiguous contact between the tapered journal 22 and the flare 15. The balls 3 are held in a space between the ball races 231 and 41 of the flaring ball cup 23 and the cone of the axle 4, respectively, forming an integrated rigid body to resist externally applied shock.

I claim:

1. A hub assembly for a bicycle wheel comprising:

a hub shell having a pair of opposing flat rod shaped open ends, each of said flat rod shaped ends having a portion thereof integrally formed into a hub flange extending from an external surface thereof and a flared inner wall surface extending from a location corresponding to said hub flange to a central portion of said hub shell;

a pair of longitudinally extended ball cups respectively press fit into said pair of opposing flat rod shaped open ends, each of said pair of ball cups having a bearing portion adjacent one longitudinal end thereof, a journal portion adjacent an opposing longitudinal end of said ball cup, and a through bore extending between said bearing portion and said journal portion, said bearing portion having a ball race formed therein, said journal portion having a tapered outer wall surface corresponding to said flared inner wall surface of said hub shell for clamping engagement therebetween and positively locating said ball cup with respect to a respective flat rod shaped open end of said hub shell;

an axle extending longitudinally through said through bore, said axle having a pair of ball races formed adjacent opposing ends thereof corresponding to said ball races of said pair of cups; and, a plurality of balls disposed between said ball races of said axle and said ball cups for form bearings between said axle and said hub shell.

* * * * *